US007783799B1

(12) United States Patent
Sivertsen (10) Patent No.: US 7,783,799 B1
(45) Date of Patent: Aug. 24, 2010

(54) REMOTELY CONTROLLABLE SWITCH AND TESTING METHODS USING SAME

(75) Inventor: Clas Gerhard Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 186 days.

(21) Appl. No.: 11/513,635

(22) Filed: Aug. 31, 2006

(51) Int. Cl.
G06F 13/12 (2006.01)
G06F 9/00 (2006.01)

(52) U.S. Cl. ............................ 710/62; 710/8; 710/14; 710/51; 710/67; 710/73; 710/305; 713/1; 713/2; 345/156; 345/168

(58) Field of Classification Search .............. 710/8, 710/14, 51, 62, 67, 73, 305; 713/1, 2; 345/156, 345/168
See application file for complete search history.

(56) References Cited

U.S. PATENT DOCUMENTS

| | | | |
|---|---|---|---|
| 4,589,068 A | 5/1986 | Heinen, Jr. .................. 717/127 |
| 4,979,074 A | 12/1990 | Morley et al. ............... 361/720 |
| 5,228,039 A | 7/1993 | Knoke et al. .................. 714/28 |
| 5,388,252 A | 2/1995 | Dreste et al. .................. 714/46 |
| 5,455,933 A | 10/1995 | Schieve et al. ................ 714/27 |
| 5,491,743 A | 2/1996 | Shiio et al. .................. 709/204 |
| 5,615,331 A | 3/1997 | Toorians et al. ........ 395/182.07 |
| 5,625,410 A | 4/1997 | Washino et al. | |
| 5,630,049 A | 5/1997 | Cardoza et al. ............... 714/25 |
| 5,732,212 A | 3/1998 | Perholtz et al. ............. 709/224 |
| 5,777,874 A | 7/1998 | Flood et al. .................. 700/82 |
| 5,815,653 A | 9/1998 | You et al. ..................... 714/38 |
| 5,819,093 A | 10/1998 | Davidson et al. ............ 717/126 |
| 5,850,562 A | 12/1998 | Crump et al. ............... 395/800 |
| 5,878,158 A | 3/1999 | Ferris et al. ................. 382/125 |
| 5,883,665 A * | 3/1999 | Galler et al. ................ 348/192 |
| 5,953,451 A | 9/1999 | Syeda-Mahmood ......... 382/187 |
| 5,990,852 A | 11/1999 | Szamrej ...................... 345/2.1 |

(Continued)

OTHER PUBLICATIONS

"Case Study: Implementing an 8-1 MUX" by Charles C. Lin, 2003.*

(Continued)

Primary Examiner—Henry W. H. Tsai
Assistant Examiner—Steven G Snyder
(74) Attorney, Agent, or Firm—Morris, Manning & Martin LLP; Tim Tingkang Xia (57) ABSTRACT

Apparatus, methods, systems, and computer-readable media are provided for remotely controlling the connection between a host computer and a multitude of connected devices. One apparatus described herein includes a multiplexer that has a host port for connection to a host computer, device ports for connection to the devices, and control lines. The multiplexer is operative to connect a device port to the host port based upon the status of the control lines. The apparatus further includes a controller connected to the multiplexer. The controller has an input interface and is operative to receive control data on the input interface that identifies a device port on the apparatus that should be connected to the host port. In response to receiving such control data, the controller is operative to place signals on the control lines that cause the multiplexer to connect the identified device port to the host port. The device port that is connected to the host port can be remotely selected by transmitting the appropriate data to the input interface of the controller.

12 Claims, 5 Drawing Sheets

U.S. PATENT DOCUMENTS

| | | | |
|---|---|---|---|
| 6,011,920 A | 1/2000 | Edwards et al. | 717/130 |
| 6,035,059 A | 3/2000 | Kurosawa et al. | 382/164 |
| 6,054,676 A | 4/2000 | Wall et al. | 219/209 |
| 6,055,334 A | 4/2000 | Kato | 382/190 |
| 6,065,072 A | 5/2000 | Flath | 710/29 |
| 6,115,645 A | 9/2000 | Berar | 700/121 |
| 6,119,247 A | 9/2000 | House et al. | 714/38 |
| 6,124,811 A | 9/2000 | Acharya et al. | 341/63 |
| 6,137,455 A | 10/2000 | Duo | 345/520 |
| 6,145,088 A | 11/2000 | Stevens | 714/2 |
| 6,170,021 B1 | 1/2001 | Graf | 710/15 |
| 6,202,070 B1 | 3/2001 | Nguyen et al. | 707/104.1 |
| 6,209,023 B1 | 3/2001 | Dimitroff et al. | 709/211 |
| 6,219,695 B1 | 4/2001 | Guttag et al. | 709/217 |
| 6,236,884 B1 | 5/2001 | Hunter et al. | 600/544 |
| 6,243,743 B1 | 6/2001 | Freeny | 709/217 |
| 6,249,885 B1 | 6/2001 | Johnson et al. | 714/47 |
| 6,263,373 B1 | 7/2001 | Cromer et al. | 709/250 |
| 6,272,562 B1 | 8/2001 | Scott et al. | 710/16 |
| 6,288,753 B1 | 9/2001 | DeNicola et al. | 348/586 |
| 6,304,895 B1 | 10/2001 | Schneider et al. | 709/203 |
| 6,330,167 B1 | 12/2001 | Kobayashi | 361/818 |
| 6,360,250 B1 | 3/2002 | Anupam et al. | 709/204 |
| 6,377,461 B1 | 4/2002 | Ozmat et al. | 361/704 |
| 6,378,009 B1 * | 4/2002 | Pinkston et al. | 710/62 |
| 6,378,014 B1 | 4/2002 | Shirley | 710/100 |
| 6,397,256 B1 | 5/2002 | Chan et al. | 709/229 |
| 6,414,716 B1 | 7/2002 | Kawai | 348/211 |
| 6,434,003 B1 | 8/2002 | Roy et al. | 361/699 |
| 6,476,854 B1 | 11/2002 | Emerson et al. | 348/143 |
| 6,535,976 B1 * | 3/2003 | Hoggarth et al. | 713/2 |
| 6,552,914 B1 | 4/2003 | Chang | |
| 6,560,641 B1 | 5/2003 | Powderly et al. | 709/219 |
| 6,601,119 B1 | 7/2003 | Slutz et al. | 710/104 |
| 6,603,665 B1 | 8/2003 | Truong et al. | 361/752 |
| 6,609,034 B1 | 8/2003 | Ehrens et al. | 700/19 |
| 6,636,929 B1 | 10/2003 | Frantz et al. | 710/313 |
| 6,636,982 B1 | 10/2003 | Rowlands | 714/4 |
| 6,651,120 B2 | 11/2003 | Chiba et al. | 710/65 |
| 6,651,190 B1 | 11/2003 | Worley et al. | 714/43 |
| 6,662,217 B1 | 12/2003 | Godfrey et al. | 709/219 |
| 6,664,969 B1 | 12/2003 | Emerson et al. | 345/544 |
| 6,671,756 B1 * | 12/2003 | Thomas et al. | 710/73 |
| 6,681,250 B1 | 1/2004 | Thomas et al. | 709/226 |
| 6,754,891 B1 | 6/2004 | Snyder et al. | 717/128 |
| 6,779,004 B1 | 8/2004 | Zintel | 709/227 |
| 6,816,963 B1 | 11/2004 | Krithivas et al. | 713/1 |
| 6,820,267 B2 | 11/2004 | Christensen et al. | 719/315 |
| 6,825,846 B2 | 11/2004 | Mondal | 345/547 |
| 6,839,790 B2 * | 1/2005 | Barros De Almeida et al. | 710/305 |
| 6,894,906 B2 | 5/2005 | Sivertsen | 361/796 |
| 6,907,519 B2 | 6/2005 | Desoli | 712/227 |
| 6,959,380 B2 | 10/2005 | Dake et al. | 713/2 |
| 6,963,425 B1 | 11/2005 | Nair et al. | 358/1.9 |
| 6,993,747 B1 | 1/2006 | Friedman | 717/124 |
| 7,003,563 B2 | 2/2006 | Leigh et al. | 709/223 |
| 7,039,229 B2 | 5/2006 | Lin et al. | 382/165 |
| 7,058,928 B2 | 6/2006 | Golender et al. | 717/124 |
| 7,085,814 B1 | 8/2006 | Gandhi et al. | 709/208 |
| RE39,395 E * | 11/2006 | Rangan et al. | 370/366 |
| 7,181,510 B2 | 2/2007 | Emerson et al. | 709/222 |
| 7,209,874 B2 | 4/2007 | Salmonsen | 703/23 |
| 7,231,606 B2 | 6/2007 | Miller et al. | 715/738 |
| 7,233,336 B2 | 6/2007 | Mondal | 345/547 |
| 7,260,624 B2 | 8/2007 | Sivertsen | 709/223 |
| 7,299,463 B2 | 11/2007 | Brannock et al. | 717/169 |
| 7,349,956 B2 | 3/2008 | Anderson et al. | 709/219 |
| 7,555,421 B1 | 6/2009 | Beckett et al. | 703/23 |
| 2001/0027465 A1 | 10/2001 | Hammelbacher | 709/201 |
| 2001/0037366 A1 | 11/2001 | Web et al. | 709/204 |
| 2002/0023179 A1 * | 2/2002 | Stanley | 710/8 |
| 2002/0040418 A1 | 4/2002 | Bress et al. | 711/112 |
| 2002/0078188 A1 | 6/2002 | Anand et al. | 709/222 |
| 2002/0083156 A1 | 6/2002 | Wyscoczynski | 709/219 |
| 2002/0087949 A1 | 7/2002 | Golender et al. | 717/124 |
| 2002/0097234 A1 | 7/2002 | Sauber | 345/204 |
| 2002/0103882 A1 | 8/2002 | Johnston et al. | 709/218 |
| 2002/0124128 A1 | 9/2002 | Qiu | 710/302 |
| 2002/0174415 A1 | 11/2002 | Hines | 717/127 |
| 2002/0178320 A1 | 11/2002 | Wu | 710/306 |
| 2002/0194403 A1 | 12/2002 | Pua et al. | 710/62 |
| 2002/0199035 A1 | 12/2002 | Christensen et al. | 709/330 |
| 2003/0023435 A1 | 1/2003 | Josephson | 704/235 |
| 2003/0035049 A1 | 2/2003 | Dickens et al. | 348/100 |
| 2003/0058248 A1 | 3/2003 | Hockmuth et al. | 345/537 |
| 2003/0083842 A1 | 5/2003 | Miller et al. | 702/122 |
| 2003/0110244 A1 | 6/2003 | Mondal | 709/223 |
| 2003/0156132 A1 | 8/2003 | Gn et al. | 345/740 |
| 2003/0177111 A1 | 9/2003 | Egendorf et al. | 707/3 |
| 2003/0200273 A1 | 10/2003 | Khanna et al. | 709/28 |
| 2003/0222801 A1 * | 12/2003 | Ying et al. | 341/26 |
| 2003/0226015 A1 | 12/2003 | Neufeld et al. | 713/166 |
| 2004/0054838 A1 | 3/2004 | Hoese et al. | 710/305 |
| 2004/0059782 A1 | 3/2004 | Sivertsen | 709/204 |
| 2004/0158614 A1 | 8/2004 | Williams | 709/207 |
| 2004/0190773 A1 | 9/2004 | Messer et al. | 382/182 |
| 2004/0199699 A1 * | 10/2004 | Bobbitt et al. | 710/305 |
| 2004/0215617 A1 | 10/2004 | Ramsey et al. | 707/10 |
| 2004/0222944 A1 | 11/2004 | Sivertsen | 345/1.1 |
| 2004/0230668 A1 | 11/2004 | Carnahan et al. | 709/217 |
| 2004/0243883 A1 | 12/2004 | Shankar et al. | 714/38 |
| 2004/0255276 A1 | 12/2004 | Rovang | 717/124 |
| 2005/0021654 A1 | 1/2005 | Kern et al. | 709/211 |
| 2005/0038985 A1 * | 2/2005 | Taylor | 713/2 |
| 2005/0044244 A1 | 2/2005 | Warwick et al. | 709/229 |
| 2005/0066000 A1 | 3/2005 | Liaw et al. | 709/204 |
| 2005/0086670 A1 | 4/2005 | Christensen et al. | 719/330 |
| 2005/0144443 A1 * | 6/2005 | Cromer et al. | 713/165 |
| 2005/0216620 A1 * | 9/2005 | Sandulescu et al. | 710/62 |
| 2006/0107061 A1 * | 5/2006 | Holovacs | 713/182 |
| 2006/0146491 A1 * | 7/2006 | Chen | 361/683 |
| 2006/0189900 A1 | 8/2006 | Flaherty | 600/595 |
| 2006/0195042 A1 | 8/2006 | Flaherty | 600/544 |
| 2007/0168746 A1 | 7/2007 | Righi et al. | 714/38 |
| 2007/0206630 A1 * | 9/2007 | Bird | 370/465 |
| 2008/0126589 A1 * | 5/2008 | Husain et al. | 710/14 |

OTHER PUBLICATIONS

'PS/2 KVM Splitter—control 1 PC with 2 keyboards, monitors & mice' by VPI (Video Products Inc), posted at http://www.vpi.us/kvm-splitter.html on Feb. 5, 2005.*

'2-Port Reverse KVM Switch' by Belkin, posted at http://catalog.belkin.com/IWCatProductPage.process?Product_Id=87647 on Jan. 26, 2004.*

'Structured Computer Organization' Second Edition, by Tanenbaum, copyright 1984.*

American Megatrends AMIDiag for Windows User's Guide (Version 2.0), Feb. 25, 2002. http://ami.com/support/docc/MAN-DIAG-WIN.pdf.

U.S. Appl. No. 10/875,641, filed Jun. 24, 2004, Entitled "Method and System For Remote Software Debugging", Inventors: Stefano Righi and Eric Mills.

U.S. Notice of Allowance and Allowability dated Jan. 11, 2008 in U.S. Appl. No. 10/403,198.

U.S. Official Action dated Jan. 8, 2008 in U.S. Appl. No. 10/446,044.

U.S. Official Action dated Dec. 17, 2007 in U.S. Appl. No. 10/790,160.

U.S. Official Action dated Dec. 27, 2007 in U.S. Appl. No. 10/867,406.

U.S. Official Action dated Jul. 27, 2007 in U.S. Appl. No. 10/875,641.

U.S. Official Action dated Jan. 10, 2008 in U.S. Appl. No. 10/875,641.

"Cable Allows Users to Extend DVI Connections," Jul. 31, 2001, *The Mac Observer*, printed from http://www.macobserver.com/article/2001/07/31.11.shtml, 4 pages.

U.S. Appl. No. 10/790,160, filed Mar. 1, 2004, entitled "Method, System and Apparatus for Communicating with a Computer Management Device," Inventor: Subash Kalbarga.

U.S. Appl. No. 10/926,241, filed Aug. 25, 2004, entitled "Apparatus, Methods, and Systems for Redirecting Input and Output for Multiple Computers," Inventor: Clas Gerhard Sivertsen.

U.S. Official Action dated Aug. 13, 2003 in U.S. Appl. No. 10/016,484.

U.S. Official Action dated Mar. 8, 2004 in U.S. Appl. No. 10/016,484.

U.S. Official Action dated Jun. 22, 2004 in U.S. Appl. No. 10/016,484.

U.S. Official Action dated Apr. 18, 2006 in U.S. Appl. No. 10/966,221.

U.S. Official Action dated Sep. 5, 2006 in U.S. Appl. No. 10/966,221.

U.S. Official Action dated Feb. 23, 2004 in U.S. Appl. No. 10/247,876.

U.S. Official Action dated Aug. 3, 2004 in U.S. Appl. No. 10/247,876.

U.S. Official Action dated Feb. 3, 2005 in U.S. Appl. No. 10/247,876.

U.S. Official Action dated Aug. 8, 2005 in U.S. Appl. No. 10/247,876.

U.S. Official Action dated Feb. 24, 2006 in U.S. Appl. No. 10/247,876.

U.S. Official Action dated Aug. 17, 2006 in U.S. Appl. No. 10/247,876.

U.S. Official Action dated Feb. 27, 2007 in U.S. Appl. No. 10/867,406.

U.S. Official Action dated Aug. 10, 2007 in U.S. Appl. No. 10/867,406.

U.S. Official Action dated Jun. 29, 2007 in U.S. Appl. No. 10/462,509.

U.S. Official Action dated Mar. 6, 2007 in U.S. Appl. No. 10/462,509.

U.S. Official Action dated Sep. 11, 2006 in U.S. Appl. No. 10/462,509.

U.S. Official Action dated Jan. 24, 2006 in U.S. Appl. No. 10/446,044.

U.S. Official Action dated Jul. 14, 2006 in U.S. Appl. No. 10/446,044.

U.S. Official Action dated Oct. 5, 2006 in U.S. Appl. No. 10/446,044.

U.S. Official Action dated Apr. 5, 2007 in U.S. Appl. No. 10/446,044.

U.S. Official Action dated Sep. 18, 2007 in U.S. Appl. No. 10/446,044.

U.S. Official Action dated Sep. 19, 2006 in U.S. Appl. No. 10/403,198.

U.S. Official Action dated Mar. 6, 2007 in U.S. Appl. No. 10/403,198.

U.S. Notice of Allowance and Allowability dated Jul. 15, 2004 in U.S. Appl. No. 10/016,484.

U.S. Notice of Allowance and Allowability dated Jan. 5, 2007 in U.S. Appl. No. 10/966,221.

U.S. Notice of Allowance and Allowability dated Apr. 11, 2007 in U.S. Appl. No. 10/247,876.

U.S. Notice of Allowance and Allowability dated Nov. 10, 2004 in U.S. Appl. No. 10/867,348.

U.S. Notice of Allowance and Allowability dated Nov. 1, 2007 in U.S. Appl. No. 10/462,509.

U.S. Notice of Allowance and Allowability dated May 31, 2007 in U.S. Appl. No. 10/403,198.

U.S. Notice of Allowance and Allowability dated Sep. 18, 2007 in U.S. Appl. No. 10/403,198.

"Z-Series Information Page" printout from Raritan website found at www.Raritan.com/products/kvm_switches/z_series/prd_line.aspx. Printed Feb. 10, 2006.

"New KVM Switching System Controls 2,048 Servers Using Cat5 Cable" printout from Raritan website found at http://www.raritan.com//about/abt_press_detail.aspx?&status=4&articleId=127, printed May 23, 2006.

Raritan Computer, Inc., "Raritan Announces New Paragon CIMs with Innovative DirectConnect Technology," a press release, Jan. 14, 2002, printed from www.raritan.com on Jan. 27, 2005.

American Megatrends, Inc. AMIdebug User's Guide (Version 2.0), 2002.

U.S. Official Action dated Nov. 29, 2007 in U.S. Appl. No. 10/462,509.

U.S. Notice of Allowance / Allowability dated Jul. 23, 2008 in U.S. Appl. No. 10/867,406.

U.S. Notice of Allowance / Allowability dated May 13, 2008 in U.S. Appl. No. 10/403,198.

U.S. Official Action dated Jun. 3, 2008 in U.S. Appl. No. 10/875,641.

U.S. Notice of Allowance / Allowability dated Jun. 9, 2008 in U.S. Appl. No. 10/446,044.

U.S. Official Action dated Jun. 25, 2008 in U.S. Appl. No. 10/790,160.

U.S. Official Action dated Jul. 9, 2008 in U.S. Appl. No. 10/462,509.

American Megatrends, Inc., AMIBIOS8, Introduction to AMIBIOS8™: Overview of Key Features in the Latest AMIBIOS®, Version 1.20, Mar. 25, 2002, 22 pages.

American Megatrends, Inc., AMI Debug Source Level Modular Software Debugger, Data Sheet, Dec. 14, 2004, 2 pages.

AVIT Research, Ltyd., I$^2$C Bus Tool, printed from www.avitresearch.co.uk/ on Aug. 29, 2005, 4 pages.

Calibre, "UCA93LV: USB—I$^2$C Communications Adapter for PCs" Jan. 28, 2005, 2 pages.

Saelig Online Store, UCA93LV, printed from www.saeliq.com on Aug. 29, 2005, 2 pages.

U.S. Official Action dated May 14, 2008 in U.S. Appl. No. 11/300,045.

U.S. Official Action dated Sep. 8, 2008 in U.S. Appl. No. 10/926,241.

U.S. Notice of Allowance / Allowability dated Jan. 26, 2009 in U.S. Appl. No. 10/462,509.

U.S. Official Action dated Jan. 7, 2009 in U.S. Appl. No. 10/790,160.

U.S. Notice of Allowance / Allowability dated Jan. 8, 2009 in U.S. Appl. No. 10/875,641.

U.S. Notice of Allowance / Allowability dated Dec. 2, 2008 in U.S. Appl. No. 10/926,241.

U.S. Official Action dated Dec. 2, 2008 in U.S. Appl. No. 11/300,045.

U.S. Appl. No. 12/395,015, filed Feb. 27, 2009, entitled "Redirecting Input and Output for Multiple Computers", Inventor: Clas Gerhard Sivertsen.

U.S. Appl. No. 12/395,022, filed Feb. 27, 2009, entitled "Redirecting Input and Output for Multiple Computers", Inventor: Clas Gerhard Sivertsen.

U.S. Appl. No. 12/395,028, filed Feb. 27, 2009, entitled "Redirecting Input and Output for Multiple Computers", Inventor: Clas Gerhard Sivertsen.

U.S. Appl. No. 12/425,455, filed Apr. 17, 2009, entitled "Method and System for Remote Software Debugging", Inventors: Righi et al.

U.S. Appl. No. 12/470,854, filed May 22, 2009, entitled "Method and System for Remote Software Testing", Inventor: Gene Rovang.

U.S. Official Action dated Jul. 1, 2009 in U.S. Appl. No. 10/790,160.

U.S. Official Action dated May 27, 2009 in U.S. Appl. No. 11/300,045.

QuickSpecs: Compaq PCI Card KVM Switches, Version 5, Mar. 13, 2003, 5 pages.

U.S. Official Action dated Aug. 24, 2009 in U.S. Appl. No. 12/395,022.

U.S. Official Action dated Dec. 23, 2009 in U.S. Appl. No. 10/790,160.

U.S. Official Action dated Dec. 8, 2009 in U.S. Appl. No. 11/300,045.

U.S. Official Action dated Dec. 30, 2009 in U.S. Appl. No. 12/395,015.

U.S. Notice of Allowance / Allowability dated Mar. 11, 2010 in U.S. Appl. No. 12/395,022.

U.S. Official Action dated Apr. 23, 2010 in U.S. Appl. No. 12/395,028.

* cited by examiner

REMOTELY CONTROLLABLE SWITCH AND TESTING METHODS USING SAME

CROSS-REFERENCE TO RELATED APPLICATIONS

This application is related to co-pending U.S. patent application Ser. No. 10/462,509, which was filed on Jun. 13, 2003 and entitled "Method and System for Remote Software Testing," and which is expressly incorporated herein by reference in its entirety.

TECHNICAL FIELD

The disclosure presented herein relates generally to the field of computer peripherals. More specifically, the disclosure presented herein relates to the field of controlling the connectivity of multiple devices to a single host computer.

BACKGROUND

Companies that develop computer hardware or software often test products under development by simulating an installation of the product on a variety of operating system and hardware platforms. For example, the manufacturer of a computer system firmware must test a particular hardware platform with each release candidate of the firmware under a multitude of different operating systems ("OS"). In order to perform this type of testing, a technician will typically install a first OS on the computer system from a bootable mass storage device. During and after the installation of the OS, a series of test scripts are executed to stress, qualify, and validate the firmware. For example, scripts may be executed that particularly exercise hardware devices controlled by the firmware, such as a keyboard or mouse input device.

After the test has been completed for the first OS, the technician will then begin the installation of the second OS under test and initiate the particular tests needed during and after installation of that OS. The installation of each OS is a time consuming process with a substantial amount of idle time. There are also periods where the installation process is halted and interaction is required by the technician from the installation process to continue. As a result, this type of testing can be extremely time consuming.

A similar type of testing is also performed by companies that develop computer systems, such as motherboards, and by companies that develop computer peripherals such as media players, keyboards, pointing devices, mass storage media readers, and others. The testing performed by these types of companies often includes connecting peripheral devices to a computer system under test, testing the operation of the devices with the system, removing the devices, connecting other devices for testing, and repeating the process. Testing in this manner is also very labor intensive and time consuming. It is also difficult to make consistent and repeatable since it involves the physical connection and disconnection of devices by a human, a process that is prone to error.

It is with respect to these considerations and others that the various embodiments described herein have been made.

SUMMARY

According to aspects of the disclosure presented herein, an apparatus for providing a remotely controllable connection between a host computer and a multitude of connected devices is provided. According to other aspects presented herein, methods, systems, and computer-readable media are provided for utilizing the apparatus to perform automated testing of computer hardware or software. Through the utilization of the methods described herein, computer hardware and software can be tested in a more efficient fashion than through the use of prior solutions.

According to one aspect of the disclosure presented herein, an apparatus is described for providing a remotely controllable connection between a host computer and one of a multitude of connected devices. In one implementation, the apparatus includes a multiplexer that has a host port for connection to a host computer, two or more device ports for connection to the devices, and one or more control lines. The multiplexer is operative to connect one of the device ports to the host port based upon the status of the control lines.

According to aspects, the apparatus further includes a controller connected to the multiplexer. The controller has an input interface and is operative to receive control data on the input interface that identifies a device port on the apparatus that should be connected to the host port. In response to receiving such control data, the controller is operative to place signals on the control lines that cause the multiplexer to connect the identified device port to the host port. In this manner, the device port that is connected to the host port can be remotely selected by transmitting the appropriate data to the input interface of the controller. The input interface may comprise a serial communications interface and the host and device ports may comprise universal serial bus ("USB") ports.

According to other aspects, the apparatus further includes a USB-to-serial converter connected to the serial communications interface. The USB-to-serial converter is operative to receive USB signals, to convert the USB signals to a format compatible with the serial interface, and to transmit the converted signals to the serial interface of the controller. In other implementations, the apparatus may further include a local area network ("LAN")-to-serial converter connected to the serial communications interface. The LAN-to-serial converter is operative to receive LAN signals, to convert the LAN signals to a format compatible with the serial interface, and to transmit the converted signals to the serial interface of the controller.

In yet another implementation, the apparatus may further include a RS-232 transceiver connected to the serial communications interface. The RS-232 transceiver is operative to receive RS-232 signals, to convert the RS-232 signals to a format compatible with the serial interface, and to transmit the converted signals to the serial interface of the controller. The USB-to-serial converter, LAN-to-serial converter, and RS-232 transceiver may be concurrently connected to a single serial interface on the controller through the use of an appropriate logic gate, such as an AND gate. In this manner, data received via USB, LAN, or RS-232 may be utilized to select the device port that is connected to the host port by the apparatus. Other types of interface may also be similarly utilized.

According to other aspects of the implementations described herein, the apparatus may include one or more mechanical or electrical switches connected to the controller. The switches may be utilized to select which of the device ports is connected to the host port. According to other aspects, the apparatus may further comprise a field effect transistor ("FET") and a light emitting diode ("LED") corresponding to each device port. When a particular device port is selected, the FET is operative to cause power to be provided to the device port. The LED is illuminated to indicate that the device port is active and connected to the host port.

According to other aspects of the disclosure presented herein, methods are provided for automated testing utilizing a remotely controllable switch for connecting one of a multitude of devices to a host computer. According to one method, devices to be utilized in the testing are connected to the switch and a host computer is connected to the host port of the switch. A test control computer is utilized to control the operation of the switch and to thereby select the device that is connected to the host computer. The test control computer is also connected to the host computer and is operative to transmit instructions to the host computer to perform the testing using the connected device. When the host computer has completed the testing using the connected device, the test control computer causes the switch to connect the next device to the host computer. The host computer then performs the testing using the next connected device. This process repeats until the testing has been completed with each of the devices connected to the switch.

In one particular method, each of the devices connected to the switch comprises a mass storage device, such as a USB CD-ROM device. Each of the mass storage devices contains a different OS or version of an OS. The test control computer causes the host computer to perform an initial program load ("IPL") from each of the devices sequentially, and to perform testing of the host computer hardware, firmware, applications, or the OS during the boot or runtime of the OS. In this manner, hardware and software testing can be performed using many different OSs or versions of a single OS without user interaction during the testing process.

In another method, each of the devices connected to the switch comprises a computer peripheral device, such as a mouse, keyboard, or other hardware device. The test computer causes each of the peripheral devices to be sequentially connected to the host computer for testing with the host computer. In this manner, a variety of different hardware devices can be connected to the host computer for testing in an automated fashion.

Other apparatus, systems, methods, and/or computer program products according to embodiments will be or become apparent to one with skill in the art upon review of the following drawings and Detailed Description. It is intended that all such additional systems, methods, and/or computer program products be included within this description, be within the scope of the invention as claimed herein, and be protected by the accompanying claims.

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The following detailed description is directed to apparatus, methods, systems, and computer-readable media for providing a remotely controllable connection between a host computer and a multitude of connected devices and methods for testing using same. In the following detailed description, references are made to the accompanying drawings that form a part hereof, and which are shown by way of illustration specific embodiments or examples. Referring now to the drawings, in which like numerals represent like elements through the several figures, aspects of the apparatus and methods provided herein will be described.

Figure 1:
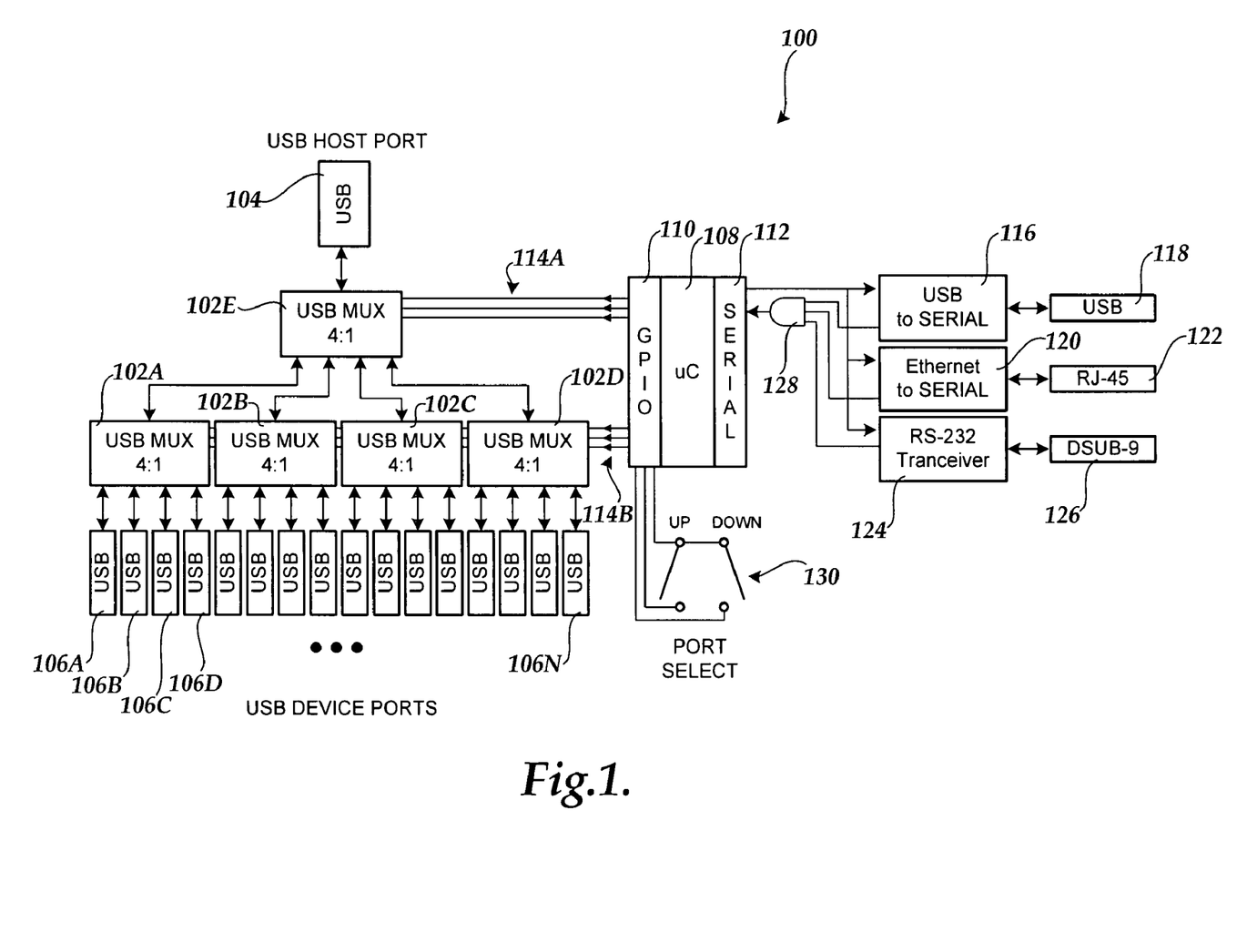
FIGS. 1 and 2 are functional circuit diagrams illustrating aspects of a remotely controllable switch provided in several implementations described herein.

FIG. 1 shows a switch 100 provided herein that is operative to allow the remote selection of one of a multitude of connected devices for connection to a host computer. In order to provide this functionality, the switch 100 includes one or more multiplexers 102A-102D (referred to herein as a "mux" or "muxes"). Each of the muxes 102A-102D includes two or more ports for connection to a device. In one implementation, the muxes 102A-102D are 4 to 1 (4:1) muxes that switch four channels into one channel. In this implementation, each of the muxes 102A-102D provides four device ports 106 for connection to an external device.

The muxes 102A-102D may be configured for multiplexing USB signals, FIREWIRE signals, or other types of bus interface signals. As an example, in one implementation, the mux 102A provides four device ports 106A-106D to which four USB devices may be connected. In this implementation, the mux 102A comprises a P13USB14 low voltage, high bandwidth, USB 2.0, 4:1 multiplexer/demultiplexer, with single enable from PERICOM CORPORATION. It should be appreciated that muxes having other configurations than that shown in FIG. 1 and from other vendors may be utilized. It should also be appreciated that more or fewer muxes may be utilized than shown in FIG. 1.

As shown in FIG. 1, each of the muxes 102A-102D includes a number of control lines 114B. By placing appropriate signals on the control lines 114B, a controller can select which of the four device ports of each mux 102A-102D are routed to the output of the mux. Additionally, in one embodiment of the invention, the output of each of the muxes 102A-102D is routed to an additional mux 102E. The output of the mux 102E is connected to a host port 104. A host computer may be connected to the host port 104 via a suitable interface, such as a USB interface on the host computer. The mux 102E also includes control lines 114A that are also connectable to a controller. By placing the appropriate signals on the control lines 114B and the control lines 114A, the controller can open a connection between one of the device ports 106A-106N and the host port 104. In this manner, a suitable device connected to one of the device ports 106A-106N can be connected to the host computer. These operations are performed under the control of the controller.

As also shown in FIG. 1, in one implementation, the switch 100 includes a controller suitable for controlling the operation of the muxes 102A-102D and 102E. In particular, in this implementation the controller is implemented as a microcontroller 108 that includes one or more general purpose input/outputs 110 ("GPIOs") and a serial communications interface 112. The GPIOs 110 are connected to the control lines 114A and 114B of the muxes 102E and 102A-102D, respectively. Through the execution of an appropriate program on the microcontroller 108, appropriate signals are placed on the control lines 114A and 114B for the selection of a particular device port. In this manner, the controller is operative to control which of the device ports 106A-106N is routed to the host port 104 and, consequently, to any connected host computer.

In one implementation, the microcontroller 108 is operative to monitor for the receipt of data on the serial communications interface 112. In particular, data may be received at the interface 112 instructing the controller to connect a particular device port 106A-106N to the host port 104. For instance, in the implementation shown in FIG. 1, if any of the numbers 1-16 are received at the interface 112, the controller is operative to place the appropriate signals on the control lines 114A and 114B to cause the identified device port to be connect to the host port 104. Similarly, receipt of the "+" character may cause the controller to activate the next device port and receipt of the "−" character may cause the controller to active a previous device port. Other data received at the interface 112 may cause the controller to perform other functions, such as powering off the switch 100, performing a test to determine the device ports to which devices are connected, to determine whether a host computer is connected, or to perform other functions.

In one implementation, converters may be utilized to allow the switch 100 to be controlled remotely via different communications mediums. In particular, a USB-to-serial converter 116 may be connected to the serial communications interface 112 to allow control of the switch 100 over a USB connection. A USB port 118 is connected to the converter 116. The USB-to-serial converter 116 is operative to receive communications on the USB port 118 and to convert the received data to a format compatible with the serial communications interface 112. The converted data is provided to the controller via the interface 112 and processed by the controller in the manner described above.

According to another implementation, a LAN-to-serial converter 122 may be connected to the serial communications interface 112 to allow control of the switch 100 over a LAN connection. A LAN port 122 is connected to the converter 120. The LAN-to-serial converter 120 is operative to receive communications on the LAN port 122 and to convert the received data to a format compatible with the serial communications interface 112. The converted data is provided to the controller via the interface 112 and processed by the controller in the manner described above. A RS-232 transceiver and DSUB-9 port 126 may be connected in a similar manner to allow the switch 100 to be controlled via an RS-232 connection.

According to one implementation, the USB-to-serial converter 116, the LAN-to-serial converter 120, and the RS-232 transceiver 124 are all present in the switch 100 and simultaneously connected to the interface 112. This is accomplished by connecting the receive line of the interface 112 to an AND logic gate 128. The outputs of each of the USB-to-serial converter 116, the LAN-to-serial converter 120, and the RS-232 transceiver 124 are also connected to the input of the AND gate 128. The transmit out signal of the interface 112 is connected directly to the USB-to-serial converter 116, the LAN-to-serial converter 120, and the RS-232 transceiver 124. In this manner, the operation of the switch 100 may be controlled through the receipt of data on any of a USB connection, a LAN connection, or a RS-232 connection. Other interfaces may be added to the switch in a similar manner.

According to another implementation, the switch 100 may include one or more mechanical or electrical switches 130 for controlling the operation of the switch 100. For instance, in FIG. 1 two switches 130 are present and connected to the GPIOs 110. The status of the switches 130 is monitored by the microcontroller 108. When the microcontroller 108 detects that one of the switches has been selected, the next device port is activated by the controller. When the microcontroller 108 detects that the other switch has been selected, a previous device port is activated by the controller. When both switches are pressed simultaneously, the switch 100 is powered off by the controller. Other functions may also be performed by the microcontroller 108 in response to detecting the selection of one or more of the switches 130.

Figure 2:
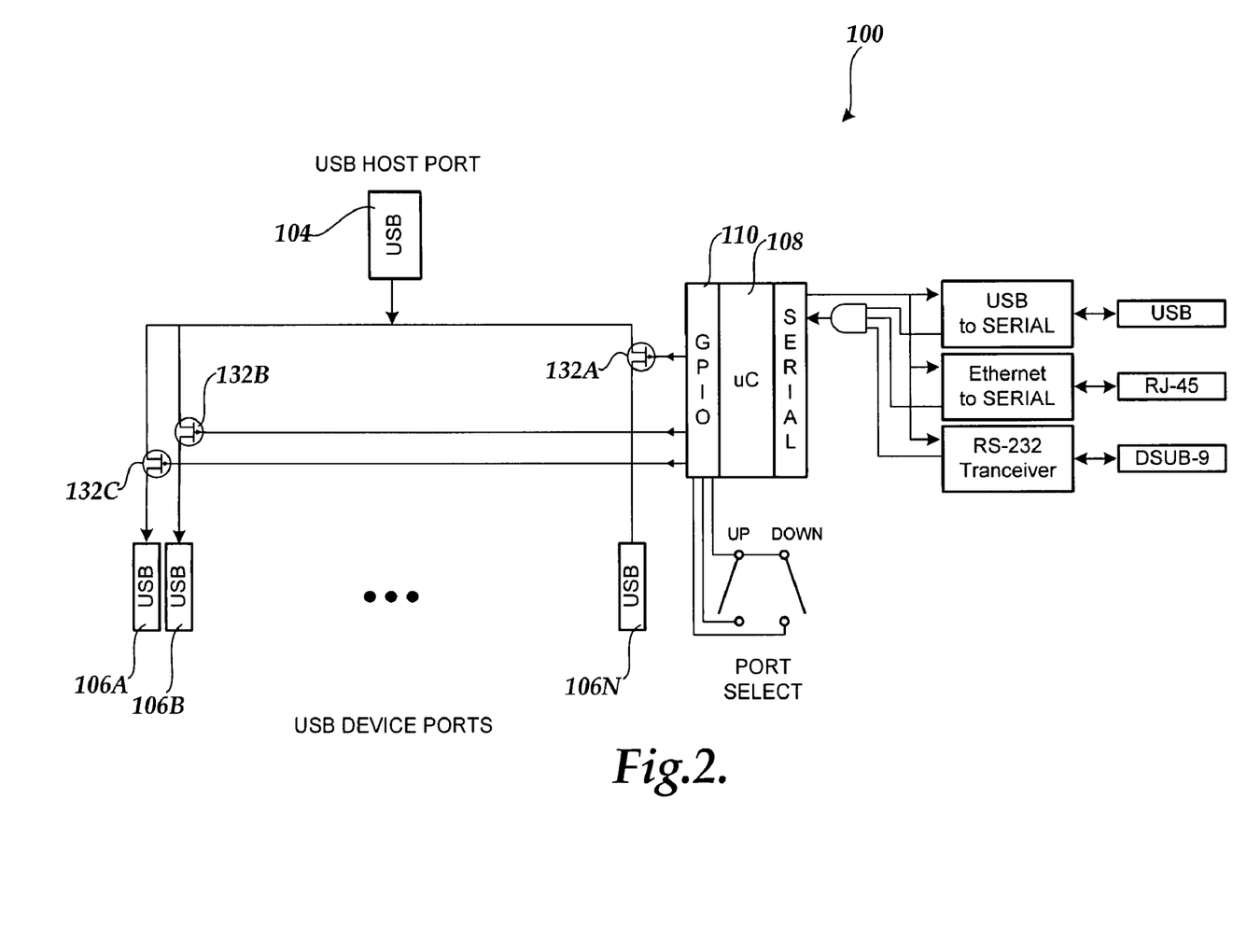

Turning now to FIG. 2, additional details will be provided regarding the functionality provided by the switch 100 in one embodiment. In particular, as shown in FIG. 2, GPIOs 110 may be connected to a FET 132A-132C associated with each device port. By controlling the signals delivered to the FETs 132A-132C by the GPIOs 110, the microcontroller 108 can cause power to be delivered to the currently active device port. In this manner, appropriate bus power can be provided to the device connected to the currently active device port and utilized by the device as needed. In a similar fashion, a LED may also be associated with each device port and the LED associated with the active device port illuminated. The LEDs may be mounted on the switch in a manner that permits the illuminated LED to clearly indicate the active device port that is connected to the host port 104 by the switch 100.

Figure 3:
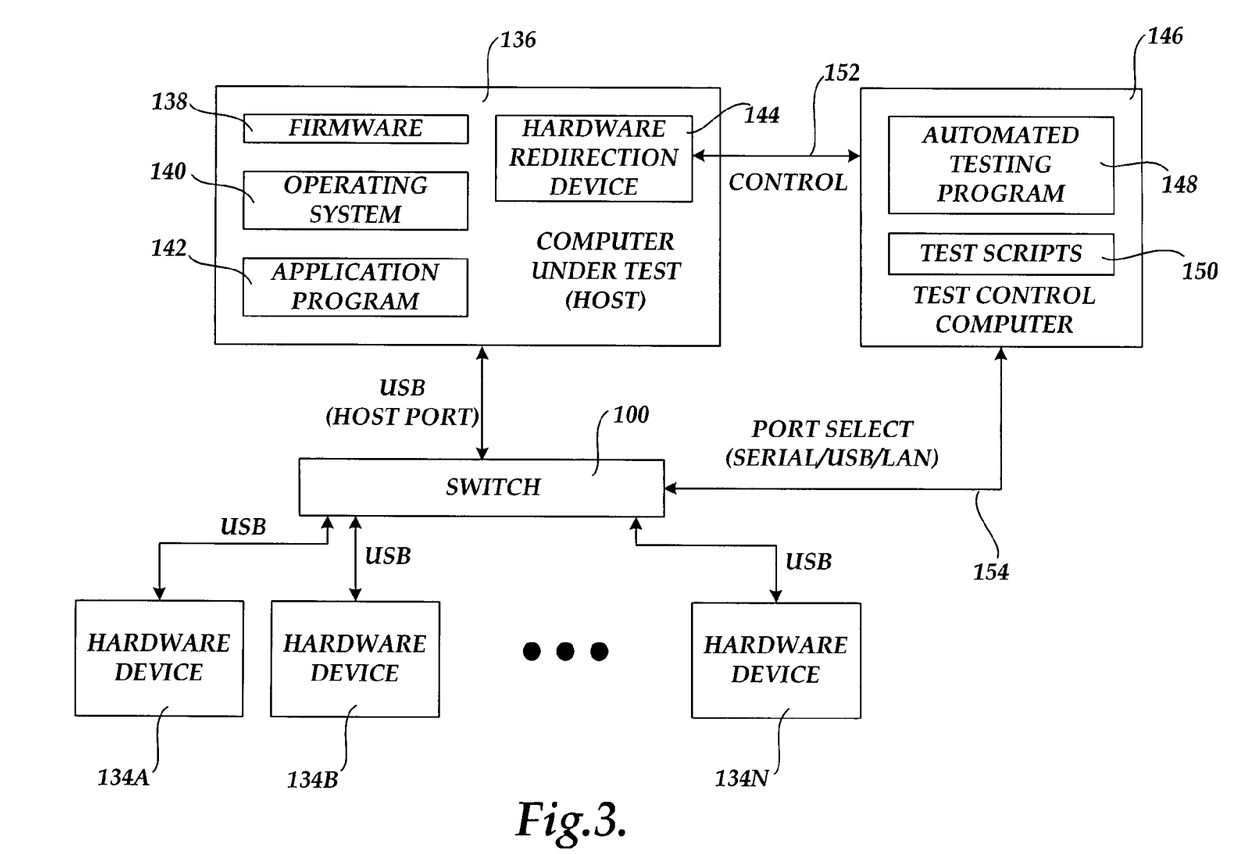
FIG. 3 is a system diagram showing aspects of a system for performing automated testing utilizing a remotely controllable switch provided herein.

Referring now to FIG. 3, aspects of a system provided herein for performing automated computer hardware and software testing using the switch 100 will be described. In particular, a test control computer 146 is connected to the USB port 118, LAN port 122, or RS-232 port 126 via a port select line 154. Through signals passed by the computer 146 to the switch 100 on the line 154, the computer 146 can cause any of a number of hardware devices 134A-134N connected to the switch 100 to be connected to a host computer 136. The host computer 136 is connected to the switch 100 via the host port 104. In this manner, the test control computer 146 is able to control which of the hardware devices 134A-134N is connected to the host computer 136 at a particular time.

As shown in FIG. 3, the test control computer 146 is also connected to the host computer 152 through a control line 152. The control line 152 may comprise a network connection between the host computer 146 and the host computer 136 or another type of connection, such as a USB connection or an RS-232 connection. Through signals sent on the control line 152, the test control computer 146 can control the operation of the host computer 136 by remotely providing mouse or keyboard input and by powering the host computer 136 on or off. In one implementation, this is accomplished through the use of a redirection device 144 at the host computer 136. The redirection device 144 receives the video output of the host computer 136 and compresses the video output for transmission to the test control computer 146. The redirection device then transmits the compressed video output of the host computer 136 to a program executing on the test control computer. Software executing on the test control computer 146 is operative to decompress the data stream and to display the video output of the host computer 136. The displayed output may include screen displays generated by the firmware 138, operating system 140, or application program 142.

Software executing on the test control computer 146 is also operative to receive user input commands, such as mouse or keyboard commands, generated at the test control computer 146 either by a user or by the automated testing program 148 and to transmit the commands to the redirection device 144. The redirection device 144 can receive the user input commands from the test control computer 146 and provide the input commands to the host computer 136 as if the input commands were physically generated by a user at the host computer 136. In order to provide this functionality, the redirection device 144 may be physically and electrically connected to the input ports of the host computer 136 (serial, USB, etc.). The redirection device 144 may also provide connections for user input devices located at the host computer 136 and may pass through signals received at the user input devices to the host computer 136. In this manner, user input commands generated by a user physically located at the host computer 136 may be passed through to the host computer 136.

Moreover, through the use of the automated testing program 148, the test scripts 150, and the redirection device 144, the test control computer 146 can test aspects of the operation of the host computer 136 and connected hardware devices. In particular, the automated testing program 148 can be utilized to test the execution of the firmware 138, the operating system 140, the application program 142, or to test the hardware devices 134A-134N. Additional details regarding this process are provided below.

It should be appreciated that the redirection device 144 may comprise a device located internal to the host computer 136 or an external device connected to the external connections of the host computer 136. Such a device is described in U.S. patent application Ser. No. 10/247,876, which was filed on Sep. 20, 2002, and entitled "Systems and Methods for Establishing Interaction Between A Local Computer and a Remote Computer", which is assigned to the assignee of the instant patent application and expressly incorporated herein.

Another embodiment may utilize a redirection device that is integrated with the main system board of the host computer 136 or contained on an adapter card located within the host computer 136. Such a device is described in U.S. patent application Ser. No. 10/016,484, entitled "Systems and Methods for Capturing Screen Displays From A Host Computing System for Display At A Remote Terminal", filed Dec. 10, 2001, and which is also assigned to the assignee of the instant patent application and expressly incorporated herein. It should be appreciated that other types of redirection devices may also be utilized. Additional details regarding the utilization of the redirection device 144 in a testing environment can be found in co-pending U.S. patent application Ser. No. 10/462,509, which was filed on Jun. 13, 2003 and entitled "Method and System for Remote Software Testing," and which is expressly incorporated herein by reference in its entirety.

According to one method, devices to be utilized in the testing are connected to the switch 100 and the host computer 136 is connected to the host port 104 of the switch 100. The test control computer 146 is utilized to control the operation of the switch 100 and to thereby select the device 134A-134N that is connected to the host computer 136. The test control computer 146 is also operative to transmit instructions to the host computer 136 to perform the testing using the connected device in the manner described above. When the host computer 136 has completed the testing using the connected device, the test control computer 146 causes the switch 100 to connect the next device to the host computer 136. The host computer 136 then performs the testing using the next connected device. This process repeats until the testing has been completed with each of the devices 134A-134N connected to the switch 100. The test control computer 146 may cause the host computer 136 to reboot, power down, or otherwise reset itself between tests.

In one particular method, each of the devices 134A-134N connected to the switch 100 comprises a mass storage device, such as a USB CD-ROM device. Each of the mass storage devices contains media having a different OS or version of an OS stored thereon. In this implementation, the test control computer 146 causes the host computer 136 to boot from each of the devices sequentially, and to perform testing of the host computer hardware, firmware, applications, or the OS during the boot or runtime of the OS. In this manner, hardware and software testing can be performed using many different OSs or versions of a single OS without user interaction during the testing process. As mentioned above, the test control computer 146 may cause the host computer 136 to reboot, power down, or otherwise reset itself between installation and testing of the different operating systems.

In another implementation, each of the devices 134A-134N connected to the switch 100 comprises a computer peripheral device, such as a mouse, keyboard, or other hardware device. The test control computer 146 causes each of the peripheral devices 134A-134N to be sequentially connected to the host computer 136 for testing with the host computer 136. In this manner, a variety of different hardware devices can be connected to the host computer 136 for testing in an automated fashion. Additional details regarding this process are provided below with respect to FIG. 4.

Figure 4:
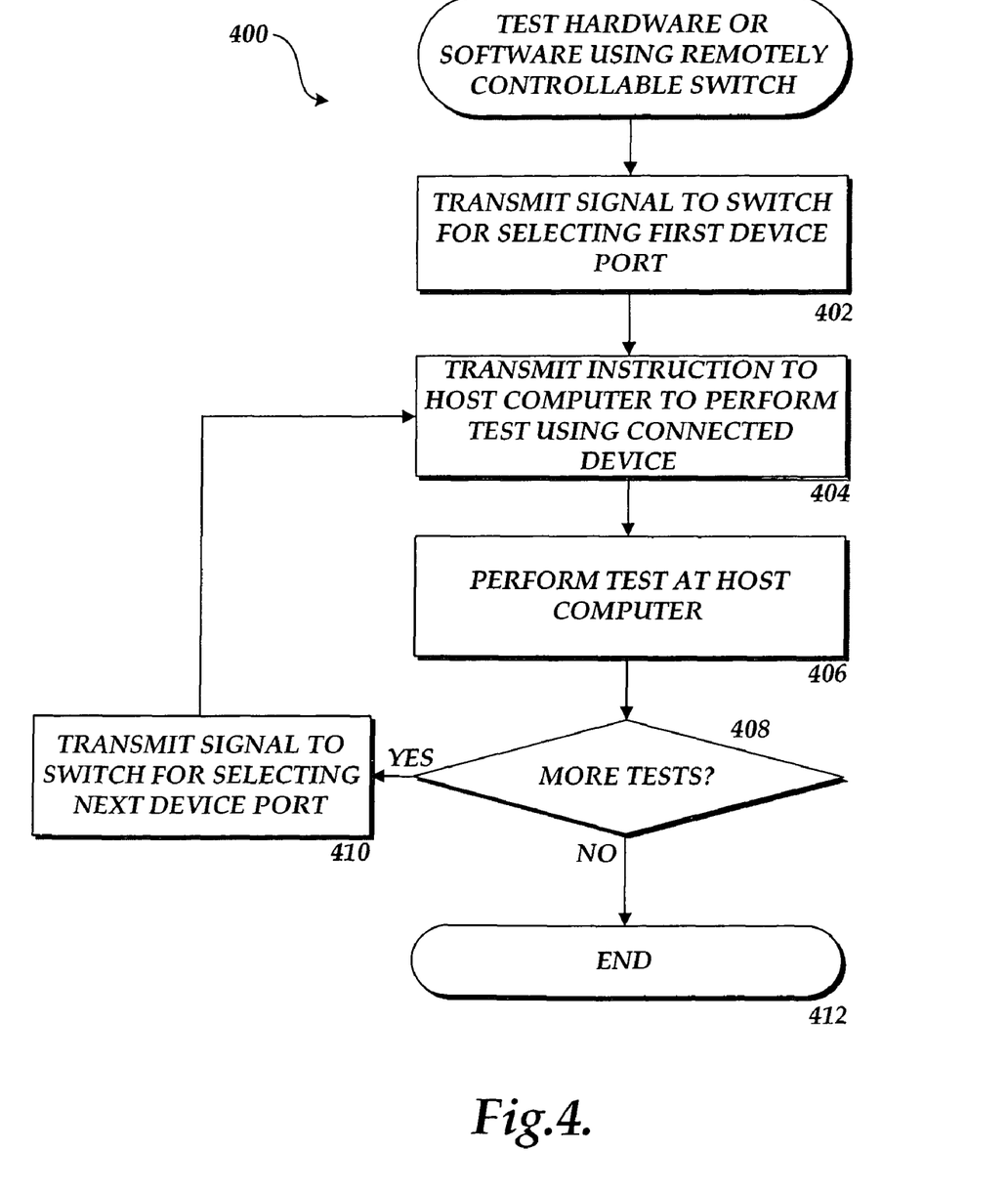
FIG. 4 is a flow diagram showing an illustrative process for performing automated testing utilizing a remotely controllable switch provided herein.

Referring now to FIG. 4, an illustrative routine 400 will be described for performing automated software or hardware testing using the switch 100. It should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 400 begins at operation 402, where the test control computer 146 transmits a signal to the switch 100 to connect the first device port 134 to the host port 104. In this manner, a first of the devices 134A-134N is connected to the host computer. The routine 400 then continues to operation 404, where the test control computer 146 transmits an instruction to the host computer 136 to perform a test using the connected device. In response to receiving the instruction, the host computer 136 performs the test at operation 406. As described above, this may include booting an OS stored on the connected device and testing the operation of the OS, testing the operation of drivers or an application with the OS, testing the behavior of hardware or firmware with the OS, and other types of functions. This may also include performing tests using a connected hardware peripheral device, such as a mouse, keyboard, or other type of device. Once the hardware test has been completed, the routine 400 continues from operation 406 to operation 408.

At operation 408, the test control computer 146 determines whether additional tests must be performed with additional devices connected to the switch 100. If so, the routine 400 branches from operation 408 to operation 410, where the test control computer 146 transmits a signal to the switch 100 to connect the next device port to the host port 104. In this manner, the next device is connected to the host computer 136. The routine 400 then branches back to operation 404, where the test is performed in the manner described above. As mentioned above, the test control computer 146 may cause the host computer 136 to power down, reboot, or otherwise reset itself between tests. When no additional tests remain to be performed, the routine 400 continues from operation 408 to operation 412, where it ends.

Figure 5:
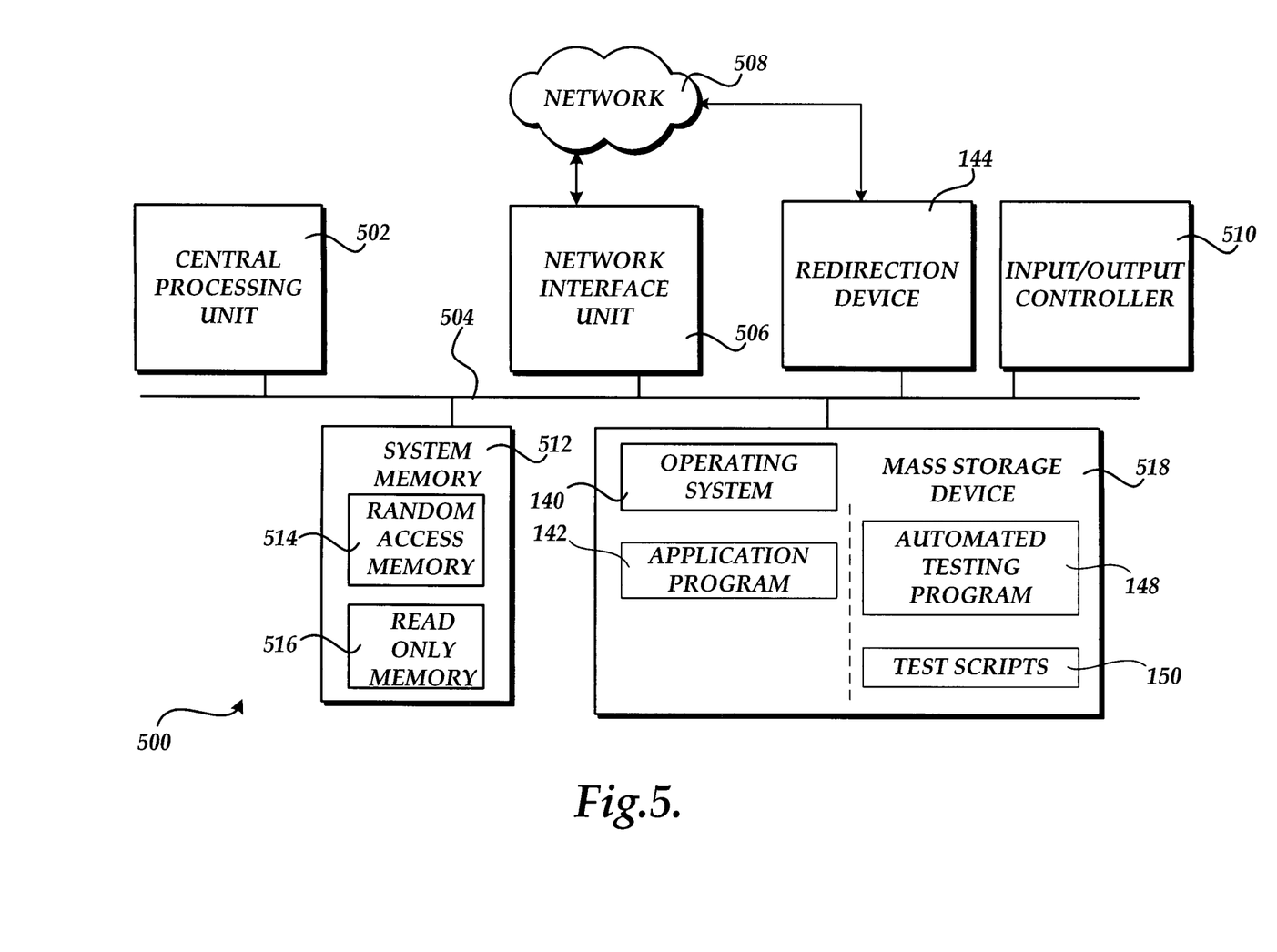
FIG. 5 is a computer architecture diagram illustrating aspects of the hardware and software utilized by one or more computers described herein that have been configured for performing automated testing utilizing a remotely controllable switch provided herein.

Referring now to FIG. 5, an illustrative computer architecture for a computer 500 utilized in the various embodiments presented herein will be discussed. FIG. 5 illustrates the architecture of a conventional desktop, laptop, or server computer, and may be utilized to embody the host computer 136 or the test control computer 146 described above with respect to FIGS. 3 and 4.

The computer architecture shown in FIG. 5 includes a central processing unit 502 ("CPU"), a system memory 512, including a random access memory 514 ("RAM") and a read-only memory ("ROM") 516, and a system bus 504 that couples the memory to the CPU 502. A basic input/output system containing the basic routines that help to transfer information between elements within the computer 500, such as during startup, is stored in the ROM 516. The computer 500 further includes a mass storage device 518 for storing an operating system 140, application programs, and other program modules and data, described below.

The mass storage device 518 is connected to the CPU 502 through a mass storage controller (not shown) connected to the bus 504. The mass storage device 518 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available media that can be accessed by the computer 500.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 508, such as the Internet. The computer 500 may connect to the network 508 through a network interface unit 506 connected to the bus 504. It should be appreciated that the network interface unit 506 may also be utilized to connect to other types of networks and remote computer systems. The computer 500 may also include an input/output controller 510 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5). The computer 500 may be equipped with a hardware redirection device 144 connected to the network 508 for providing the functionality described above with respect to FIGS. 3 and 4.

As mentioned briefly above, a number of program modules and data files may be stored in the mass storage device 518 and RAM 514 of the computer 500, including an operating system 140 suitable for controlling the operation of a networked server computer, such as the WINDOWS XP operating system from MICROSOFT CORPORATION of Redmond, Wash. The mass storage device 518 and RAM 514 may also store one or more program modules. In particular, the mass storage device 518 and the RAM 514 may store the application program 142, the automated testing program 148, and the test scripts 150, each of which was described above with respect to FIGS. 3 and 4.

Based on the foregoing, it should be appreciated that an apparatus and method are provided herein for providing a remotely controllable connection between a host computer and one of a multitude of connected devices. Although the subject matter presented herein has been described in conjunction with one or more particular embodiments and implementations, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An apparatus for providing a remotely controllable connection between a host computer and one of a multitude of connected devices, the apparatus comprising:

a multiplexer having a host port for connection to the host computer, two or more device ports for connection to the devices, and one or more control lines, the multiplexer operative to connect one of the device ports to the host port based upon the status of the control lines while others of the device ports remain unconnected to the host port;

a controller connected to the control lines of the multiplexer, the controller having a serial communications interface and being operative to receive control data on the serial communications interface from a test computer, the control data identifying a device port that should be connected to the host port, and the controller being further operative to place signals on the control lines for selecting the identified device port in response to receiving the control data on the serial communications interface;

a first converter connected to the serial communications interface, the first converter operative to receive the control data as USB data on a universal serial bus (USB) connection, to convert the received USB data to a format compatible with the serial communications interface, and to transmit the received USB data to the controller via the serial communications interface;

a second converter connected to the serial communications interface, the second converter operative to receive the control data as LAN data on a local area network (LAN) connection, to convert the received LAN data to a format compatible with the serial communications interface, and to transmit the received LAN data to the controller via the serial communications interface; and a RS-232 transceiver connected to the serial communications interface, the transceiver operative to receive the control data as RS-232 data on an RS-232 connection, to convert the received RS-232 data to a format compatible with the serial communications interface, and to transmit the received RS-232 data to the controller via the serial communications interface;

wherein, a first instruction is transmitted from a test control computer to the host computer, the first instruction operative to cause the host computer to perform a first test utilizing the first connected device, wherein the first connected device comprises a first mass storage device, and wherein performing the first test utilizing the connected device comprises performing an initial program load (IPL) for the host computer utilizing a first operating system (OS) stored on the first mass storage device and performing a first test of the host computer during or after the IPL of the first OS.

2. The apparatus of claim 1, wherein the first converter, the second converter, and the transceiver are connected to the serial communications interface of the controller by a single AND gate.

3. The apparatus of claim 2, wherein the apparatus further comprises one or more mechanical switches connected to the controller, and wherein the controller is further operative to place a first signal on the control lines for selecting a previous device in response to detecting a first selection of one or more of the mechanical switches, to place a second signal on the control lines for selecting a next device in response to detecting a second selection of one or more of the mechanical switches, and to power off in response to detecting a third selection of one or more of the mechanical switches.

4. The apparatus of claim 3, wherein the host port comprises a USB port, the device ports comprise USB ports, and wherein the multiplexer is operative to pass USB signals between the host port and one of the device ports selected based upon the status of the control lines.

5. The apparatus of claim 4, further comprising a field effect transistor (FET) corresponding to each device port, and wherein the controller is operative to cause a FET to deliver power to the selected device port.

6. The apparatus of claim 5, further comprising a light emitting diode (LED) associated with each device port, and wherein the controller is operative to cause the LED corresponding to the selected device port to be illuminated.

7. A method for automated testing, the method comprising:
transmitting a port select signal from a test control computer to a remotely controllable switch, the port select signal operative to cause the switch to create a connection between a first device of a plurality of devices connected to the switch and a host computer; and
transmitting a first instruction from the test control computer to the host computer, the first instruction operative to cause the host computer to perform a first test utilizing the first connected device, wherein the first connected device comprises a first mass storage device, and wherein performing the first test utilizing the connected device comprises performing an initial program load (IPL) for the host computer utilizing a first operating system (OS) stored on the first mass storage device and performing a first test of the host computer during or after the IPL of the first OS;
transmitting a second port select signal from the test control computer to the switch, the second port select signal operative to cause the switch to create a connection between a second device of the plurality of devices connected to the switch and the host computer; and
transmitting a second instruction from the test control computer to the host computer, the second instruction operative to cause the host computer to perform a second test utilizing the second connected device, wherein the second connected device comprises a second mass storage device, and wherein performing the second test utilizing the second connected device comprises performing an initial program load (IPL) for the host computer utilizing a second operating system (OS) stored on the second mass storage device and performing a second test of the host computer during or after the IPL of the second OS.

8. The method of claim 7, wherein the first connected device further comprises a first peripheral device, and wherein performing a test utilizing the first connected device further comprises performing a test of the first peripheral device.

9. The method of claim 8, wherein the second connected device comprises a second peripheral device, and wherein performing a second test utilizing the second connected device comprises performing a test of the second peripheral device.

10. An apparatus for providing a remotely controllable connection between a host computer and one of a multitude of connected devices, the apparatus comprising:
a first multiplexer having a host port for connection to the host computer, two or more ports for connection to two or more second multiplexers, and one or more first control lines;
two or more second multiplexers, each of the second multiplexers having a port connected to the first multiplexer, two or more device ports for connection to the devices, and one or more second control lines;
a controller connected to the first control lines of the first multiplexer and the second control lines of the second multiplexers, the controller having an input interface and being operative to receive control data on the input interface from a test computer, the control data identifying a device port on a one of the second multiplexers that should be connected to the host port on the first multiplexer, and to place signals on the control lines that cause the first and second multiplexers to connect the identified device port to the host port in response to receiving the control data on the input interface;
a first converter connected to the input interface, the first converter operative to receive the control data as USB data on a universal serial bus (USB) connection, to convert the received USB data to a format compatible with the input interface, and to transmit the received USB data to the controller via the input interface;
a second converter connected to the input interface, the second converter operative to receive the control data as LAN data on a local area network (LAN) connection, to convert the received LAN data to a format compatible with the input interface, and to transmit the received LAN data to the controller via the input interface; and
a RS-232 transceiver connected to the input interface, the transceiver operative to receive the control data as RS-232 data on an RS-232 connection, to convert the received RS-232 data to a format compatible with the input interface, and to transmit the received RS-232 data to the controller via the input interface;
wherein, a first instruction is transmitted from a test control computer to the host computer, the first instruction operative to cause the host computer to perform a first test utilizing the first connected device, wherein the first connected device comprises a first mass storage device, and wherein performing the first test utilizing the connected device comprises performing an initial program load (IPL) for the host computer utilizing a first operating system (OS) stored on the first mass storage device and performing a first test of the host computer during or after the IPL of the first OS.

11. The apparatus of claim 10, further comprising: a plurality of field effect transistors (FET), each FET corresponding to a device port; and a light emitting diode (LED) associated with each device port, and wherein the controller is operative to cause one of the plurality of FETs to deliver power to the selected device port and to cause the LED corresponding to the selected device port to be illuminated.

12. The apparatus of claim 11, wherein the host port comprises a USB port, the device ports comprise USB ports, and wherein the apparatus is operative to pass USB signals between the host port and one of the device ports selected based upon the status of the control lines.

* * * * *